(12) United States Patent
Wang

(10) Patent No.: US 8,825,098 B2
(45) Date of Patent: Sep. 2, 2014

(54) METHOD AND APPARATUS FOR PROVIDING MULTI-RATE BROADCAST SERVICES

(75) Inventor: Jin Wang, Central Islip, NY (US)

(73) Assignee: InterDigital Technology Corporation, Wilmington, DE (US)

(*) Notice: Subject to any disclaimer, the term of this patent is extended or adjusted under 35 U.S.C. 154(b) by 10 days.

(21) Appl. No.: 11/321,664

(22) Filed: Dec. 29, 2005

(65) Prior Publication Data
US 2006/0227732 A1     Oct. 12, 2006

Related U.S. Application Data

(60) Provisional application No. 60/667,808, filed on Apr. 1, 2005.

(51) Int. Cl.
| | |
|---|---|
| *H04B 7/00* | (2006.01) |
| *H04W 52/24* | (2009.01) |
| *H04W 52/50* | (2009.01) |
| *H04W 36/30* | (2009.01) |
| *H04W 36/18* | (2009.01) |
| *H04L 1/00* | (2006.01) |

(52) U.S. Cl.
CPC .............. *H04W 52/24* (2013.01); *H04W 52/50* (2013.01); *H04W 36/30* (2013.01); *H04W 36/18* (2013.01); *H04L 1/0003* (2013.01)
USPC ............. 455/522; 455/69; 370/332; 370/465; 370/312

(58) Field of Classification Search
CPC ... H04W 52/24; H04W 52/50; H04W 53/367; H04W 52/12; H04W 36/30; H04W 36/18; H04W 24/00; H04W 28/04; H04L 1/0003; H04L 1/0002
USPC ......... 370/348, 329, 341, 346, 312, 318, 338, 370/332, 333, 331, 464, 465; 375/240; 455/522, 517, 39, 500, 69, 443, 422.1, 455/436
See application file for complete search history.

(56) References Cited

U.S. PATENT DOCUMENTS

| | | | |
|---|---|---|---|
| 5,404,355 A | | 4/1995 | Raith |
| 5,748,752 A | * | 5/1998 | Reames .................. 381/94.1 |

(Continued)

OTHER PUBLICATIONS

Hamazumi et al. "Trial Application of Spread Spectrum Technologies to Hierarchical Digital Broadcasting", IEEE 4th International Symposium on Mainz, Germany, vol. 2, pp. 776-780, 1996.

*Primary Examiner* — Ajit Patel
(74) *Attorney, Agent, or Firm* — Volpe and Koenig, P.C.

(57) ABSTRACT

A method and apparatus for providing multi-rate broadcast services in a wireless communication system are disclosed. The present invention takes advantage of the higher capacity of better channels by providing a certain data rate common to all users, while sending additional information to users with better channel conditions. A base station transmits a broadcast message including common information at a basic rate and additional information at a rate higher than the basic rate. The basic rate guarantees successful receipt by all WTRUs in a coverage area and the rate for the additional information is set such that only certain WTRUs with a channel condition above a threshold may decode the additional information successfully. The WTRU decodes the common information and subtracts the common information from received signals to decode the additional information. The additional information may be information supplementing the common information, such as video information.

6 Claims, 2 Drawing Sheets

(56) References Cited

U.S. PATENT DOCUMENTS

| | | | |
|---|---|---|---|
| 5,757,416 A * | 5/1998 | Birch et al. | 725/144 |
| 5,886,999 A * | 3/1999 | Kojima et al. | 714/708 |
| 7,221,648 B2 * | 5/2007 | Das et al. | 370/231 |
| 2001/0034209 A1 * | 10/2001 | Tong et al. | 455/69 |
| 2002/0018451 A1 * | 2/2002 | Sharony | 370/329 |
| 2002/0089976 A1 * | 7/2002 | Luddy | 370/358 |
| 2002/0090028 A1 * | 7/2002 | Comer et al. | 375/240.2 |
| 2002/0146024 A1 * | 10/2002 | Harris et al. | 370/417 |
| 2002/0150077 A1 * | 10/2002 | Temerinac | 370/349 |
| 2003/0058831 A1 * | 3/2003 | Chen | 370/349 |
| 2003/0122959 A1 * | 7/2003 | Ishida et al. | 348/426.1 |
| 2004/0014482 A1 * | 1/2004 | Kwak et al. | 455/522 |
| 2004/0196904 A1 * | 10/2004 | Chun | 375/240.03 |
| 2005/0246749 A1 * | 11/2005 | Tsuruga et al. | 725/100 |
| 2006/0146787 A1 * | 7/2006 | Wijnands et al. | 370/352 |
| 2006/0171283 A1 | 8/2006 | Vijayan et al. | |
| 2006/0183287 A1 | 8/2006 | Collins et al. | |
| 2006/0232447 A1 * | 10/2006 | Walker et al. | 341/50 |

\* cited by examiner

METHOD AND APPARATUS FOR PROVIDING MULTI-RATE BROADCAST SERVICES

CROSS REFERENCE TO RELATED APPLICATION

This application claims the benefit of U.S. Provisional Application No. 60/667,808 filed Apr. 1, 2005, which is incorporated by reference as if fully set forth.

FIELD OF INVENTION

The present invention is related to a wireless communication system. More particularly, the present invention is related to a method and apparatus for providing multi-rate broadcast services.

BACKGROUND

Current cellular broadcast services provided by a base station serve a group of users within a coverage area of the base station. A base station transmits the same information to all, or a group of, users. In order to guarantee that all users located within the coverage area of the base station can receive the broadcast services with a required quality of service (QoS), the base station limits the data rate of the broadcast service to a worst channel condition or a cell boundary.

The conditions of wireless channel change over time and a wireless transmit/receive unit (WTRU) experiences dramatic variations in the channel conditions due to multipath fading, path losses via distance attenuation, shadowing by obstacles or interference. Not all users are subject to the worst channel conditions. Users may have a much better channel condition than the assumed worst case.

It is possible to serve a large number of subscribers by using a high transmission power, a high channel coding rate and transmit diversity scheme. However, by limiting the data rate to the worst channel condition, the current broadcast services underutilize better channel conditions with higher channel capacity.

SUMMARY

The present invention is related to a method and apparatus for providing multi-rate broadcast services in a wireless communication system. The present invention takes advantage of the higher capacity of better channels by providing a certain data rate common to all users, while sending additional information to users with better channel conditions. A base station transmits a broadcast message including common information at a basic rate and additional information at a rate higher than the basic rate.

The basic rate is set to guarantee successful receipt by all WTRUs in a coverage area of the base station and the rate for the additional information is set such that only certain WTRUs with a channel condition above a threshold may decode the additional information successfully. A maximum allowable transmission power for the broadcast services of the base station is allocated between the common information and the additional information.

The WTRU decodes received signals to recover the common information and subtracts the common information from the received signals to decode the additional information if the channel condition is better than the threshold. The additional information may be information supplementing the common information, such as video information.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment. When referred to hereafter, the terminology "base station" includes but is not limited to a Node-B, a site controller, an access point or any other type of interfacing device in a wireless environment.

The present invention is applicable to any wireless communication system including, but not limited to, CDMA2000, wideband code division multiple access (WCDMA)-frequency division duplex (FDD) and WCDMA-time division duplex (TDD).

The features of the present invention may be incorporated into an integrated circuit (IC) or be configured in a circuit comprising a multitude of interconnecting components.

Figure 1:
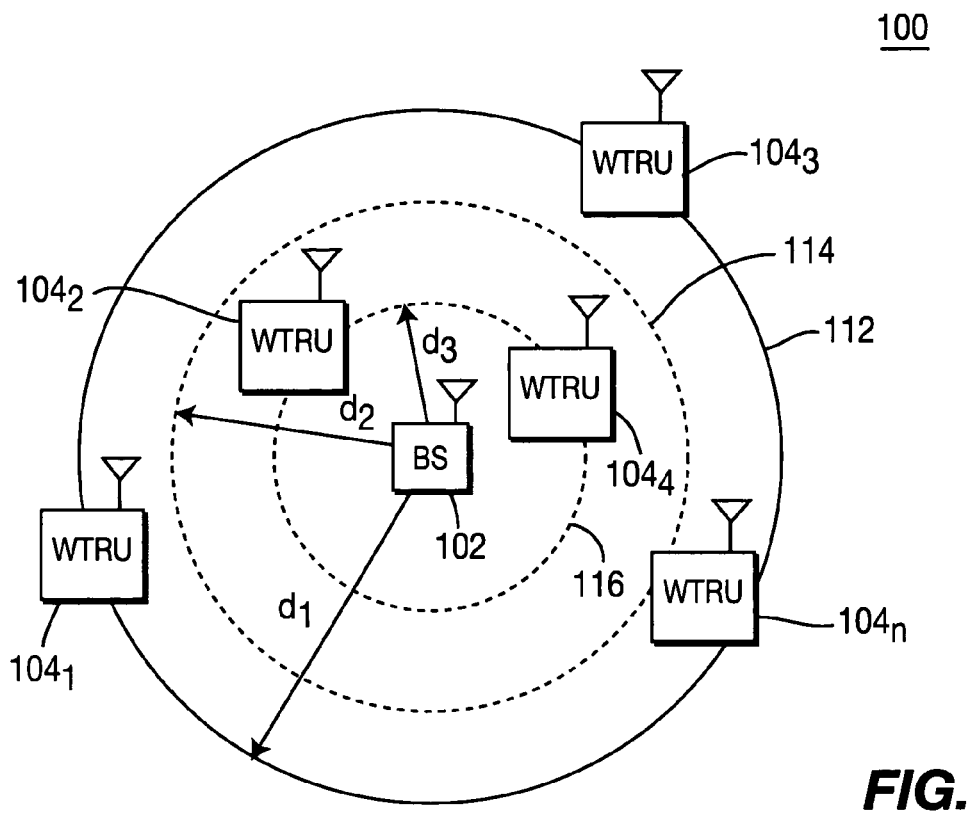
FIG. 1 is a block diagram of a wireless communication system for providing multi-rate broadcast services in accordance with the present invention.

FIG. 1 is a block diagram of a wireless communication system 100 for providing multi-rate broadcast services in accordance with the present invention. The system 100 includes a base station 102 and a plurality of WTRUs $104_1$-$104_n$ distributed throughout the coverage area 112 of the base station 102. In accordance with the present invention, the base station 102 transmits a broadcast message including common information and additional information. FIG. 1 depicts broadcasting of three information signals $d_1$-$d_3$ as an example.

Each broadcast information is transmitted with a different data rate and/or transmission power, and therefore has a different coverage distance. A data rate and a transmission power of the common information is set such that all WTRUs $104_1$-$104_n$ in the coverage area 112 of the base station 102 may successfully receive and decode the common information. Other information is encoded with a higher data rate and therefore only certain WTRUs having a better channel condition may successively receive and decode the additional information.

As shown in FIG. 1, the basic coverage area 112 includes enhanced coverage areas 114, 116 for providing broadcast services with additional information. WTRUs closer to the base station 102, such as WTRU $104_4$, have less propagation attenuation, and thus have better channel conditions, while WTRUs farther away from the base station 102, such as WTRU $104_1$, have much more link attenuation, and thus have worse channel conditions. WTRU $104_1$ can merely satisfy the signal-to-interference ratio (SIR) requirement for receiving the common information because its received SIR for additional information is less than the required SIR threshold.

Thus, WTRU $104_1$ can only decode the common information based on its available channel conditions, and the additional information only acts as interference to WTRU $104_1$. On the other hand, since WTRU $104_4$ can satisfy the target SIR requirement for the additional information, WTRU $104_4$ can decode the additional information successfully and can achieve the enhanced quality broadcast services with additional information.

Figure 2:
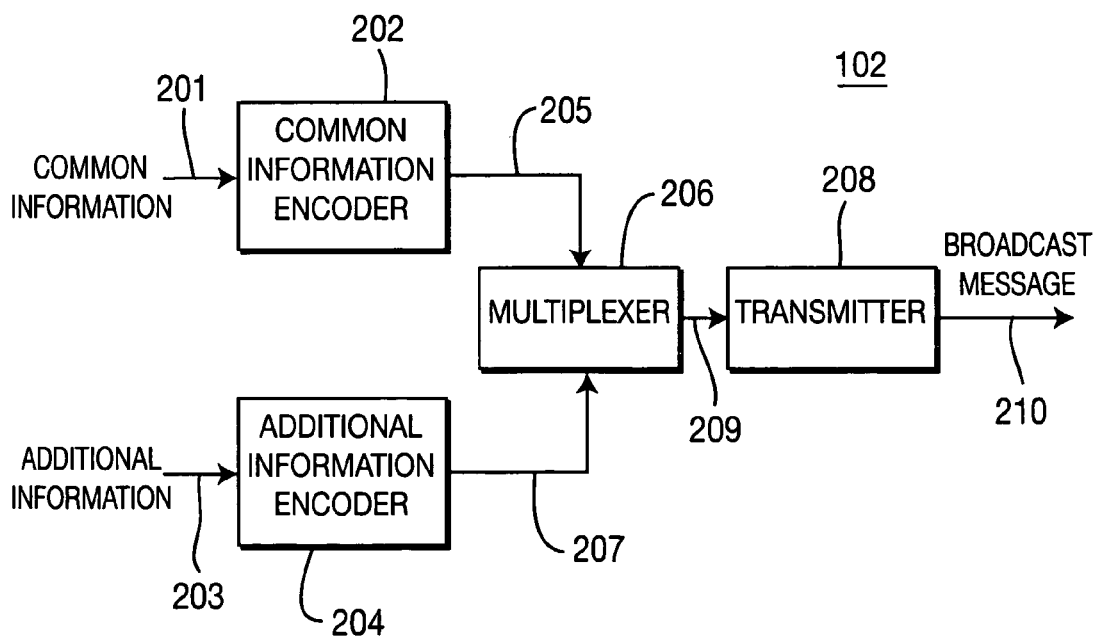
FIG. 2 is a block diagram of an exemplary base station for providing dual-rate broadcast services in accordance with the present invention.

FIG. 2 is a block diagram of a base station 102 for providing dual-rate broadcast services in accordance with the present invention. The base station 102 includes a common information encoder 202, an additional information encoder 204, a multiplexer 206 and a transmitter 208. It should be noted that FIG. 2 depicts a base station 102 for providing dual-rate broadcast services with only one additional information encoder as an example, and the base station 102 may include more than one additional information encoder for multi-rate broadcast services. The base station 102 receives common information 201 and additional information 203 from information source (not shown).

The common information 201 is encoded by the common information encoder 202 and the additional information 203 is encoded by the additional information encoder 204. The common information 201 and the additional information 203 are encoded at rates pair (R1, R2) with transmission powers $P_2=\alpha P_b$ and $P_1=(1-\alpha)P_b$, respectively, where $P_b$ is the maximum allowable transmission power for the broadcast services. The encoded common information 205 and the encoded additional information 207 are multiplexed by the multiplexer 206. The multiplexed common information and additional information 209 is then transmitted by the transmitter 208 as a broadcast message 210.

In accordance with the present invention, two or more quality of service levels are provided within one broadcast transmission and transmission power is allocated between the common information 201 and the additional information 203.

Figure 3:
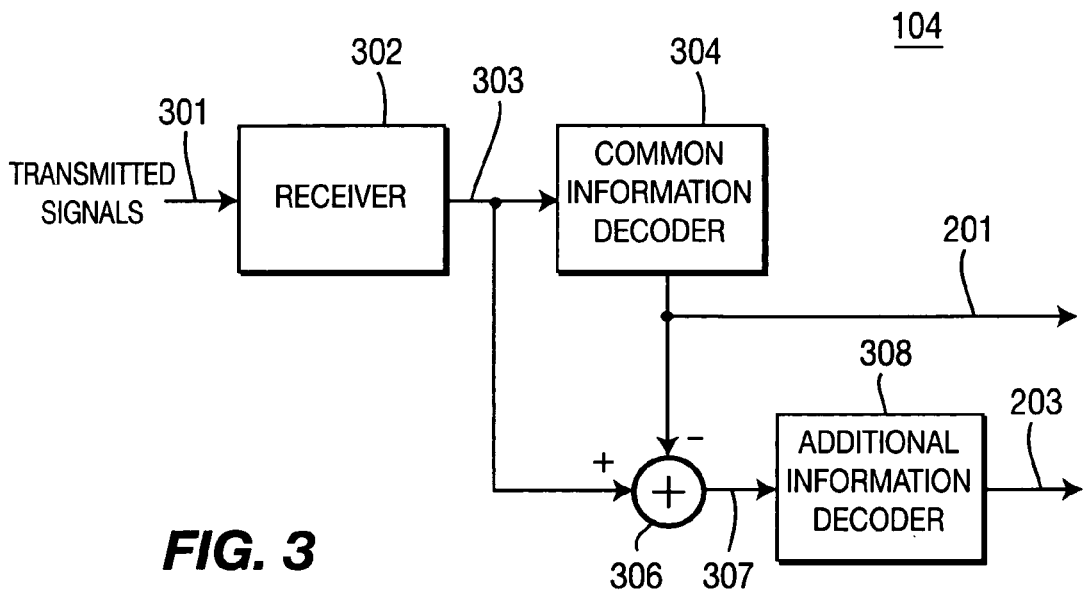
FIG. 3 is a block diagram of a WTRU for receiving dual-rate broadcast services in accordance with the present invention.

FIG. 3 is a block diagram of a WTRU 104 for receiving dual-rate broadcast services in accordance with the present invention. The WTRU 104 includes a receiver 302, a common information decoder 304, an additional information decoder 308 and a subtractor 306. It should be noted that FIG. 3 depicts a WTRU 104 for receiving dual-rate broadcast services with only one additional information decoder as an example, and the WTRU 104 may include more than one additional information decoder for receiving multi-rate broadcast services. The receiver 302 receives signals 301 including a broadcast message transmitted by the base station 102. Received signals 303 are fed to the common information decoder 304. The common information decoder 304 decodes the received signals 303 to recover the common information 201. The common information 201 is then fed to the subtractor 306. The subtractor 306 subtracts the common information 201 from the received signals 303. The subtractor output 307 is then fed to the additional information decoder 308, which recovers the additional information 203.

A WTRU 104 determines how much information the WTRU 104 can decode according to the channel conditions. When the channel conditions are poor, the WTRU 104 tries to demodulate only the common information. When the channel conditions are good, the WTRU 104 then decodes extra bits as well as the common information.

The additional information may be information supplementing the basic information. For example, the additional information may be video information while the basic information is data or voice information.

Figure 4:
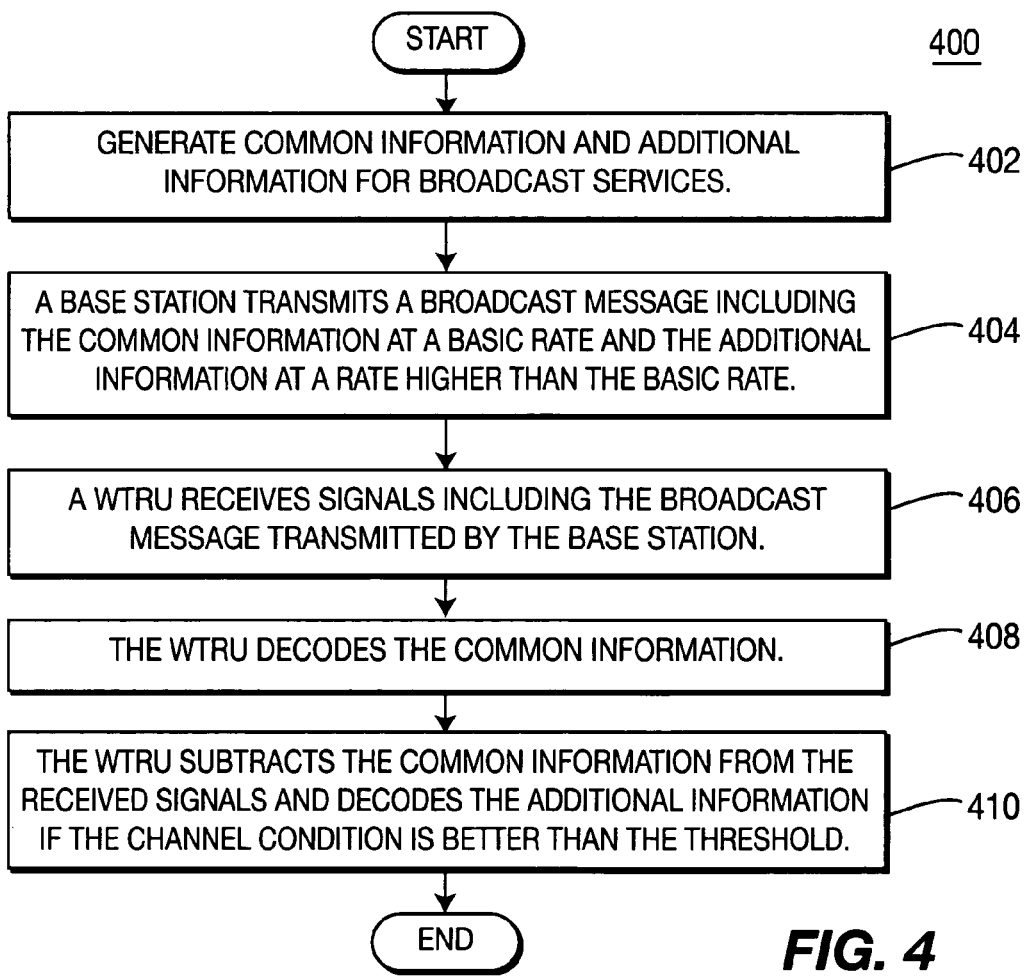
FIG. 4 is a flow diagram of a process for providing multi-rate broadcast services in accordance with the present invention.

FIG. 4 is a flow diagram of a process 400 for providing multi-rate broadcast services in accordance with the present invention. Common information and additional information are generated for providing broadcast services (step 402). A base station 102 transmits a broadcast message including the common information 201 at a basic rate and the additional information 203 at a rate higher than the basic rate (step 404). The basic rate is set to guarantee successful receipt by all WTRUs 104 in a coverage area of the base station 102 and the rate for the additional information 203 is set such that only certain WTRUs with channel conditions above a threshold may decode the additional information 203 successfully.

The WTRU 104 receives the transmitted signals (step 406). The WTRU 104 decodes the common information (step 408). If the channel conditions are better than the threshold, the WTRU 104 subtracts the common information 201 from the received signals and decodes the additional information 203 (step 410).

The present invention takes advantage of the higher capacity of the better channels by providing a certain data rate common to all users, in the mean time sending additional information to users with better channel conditions.

Although the features and elements of the present invention are described in the preferred embodiments in particular combinations, each feature or element can be used alone without the other features and elements of the preferred embodiments or in various combinations with or without other features and elements of the present invention.

What is claimed is:

1. An access point comprising:
   a transmitter configured to broadcast a signal having a first part and a second part;
   wherein the first part includes basic information and is transmitted at a first data rate that is common to all wireless transmit/receive units (WTRUs) in a coverage area; and
   wherein the second part includes additional information transmitted at a higher data rate that only a subset of WTRUs in the coverage area are able to decode, wherein the subset of WTRUs have a channel condition above a threshold.

2. The access point of claim 1, further comprising:
   at least one encoder configured to encode the common information and the additional information.

3. A method for use in an access point, the method comprising:
   broadcasting a signal having a first part and a second part;
   wherein the first part includes basic information and is transmitted at a first data rate that is common to all wireless transmit/receive units (WTRUs) in a coverage area; and
   wherein the second part includes additional information transmitted at a higher data rate that only a subset of WTRUs in the coverage area are able to decode, wherein the subset of WTRUs have a channel condition above a threshold.

4. The method of claim 3, further comprising:
   encoding the common information and the additional information.

5. An access point comprising:
   a transmitter configured to broadcast a signal having a first part and a second part;
   wherein the first part includes basic information and is transmitted at a first data rate that is able to be decoded by all wireless transmit/receive units (WTRUs) in a coverage area; and
   wherein the second part includes additional information transmitted at a higher data rate that is only able to be decoded by a subset of all WTRUs in the coverage area, wherein the subset of all WTRUs have a channel condition above a threshold.

6. The access point of claim 5, further comprising:
at least one encoder configured to encode the common information and the additional information.

\* \* \* \* \*